United States Patent
Brooks et al.

[11] Patent Number: 6,030,314
[45] Date of Patent: Feb. 29, 2000

[54] METHOD AND APPARATUS FOR RETARDING A WORK MACHINE HAVING A FLUID-COOLED BRAKE SYSTEM

[75] Inventors: Tom N. Brooks, Oakley; Dave N. Martin, Decatur; Roby A. Parks, Springfield, all of Ill.

[73] Assignee: Caterpillar Inc., Peoria, Ill.

[21] Appl. No.: 09/210,256

[22] Filed: Dec. 11, 1998

Related U.S. Application Data

[60] Provisional application No. 60/102,034, Sep. 28, 1998.

[51] Int. Cl.⁷ .................................................. B60K 41/20
[52] U.S. Cl. ................................ 477/92; 477/98; 303/191
[58] Field of Search ......................... 744/92, 98; 303/191

[56] References Cited

U.S. PATENT DOCUMENTS

| | | | |
|---|---|---|---|
| 3,320,406 | 5/1967 | Wainwright | 219/370 |
| 4,053,868 | 10/1977 | Cox et al. | 340/52 F |
| 4,086,990 | 5/1978 | Spence | 192/58 B |
| 4,124,001 | 11/1978 | Samuel et al. | 123/41.12 |
| 4,223,646 | 9/1980 | Kinder | 123/41.11 |
| 4,441,651 | 4/1984 | Dill | 236/49 |
| 4,459,087 | 7/1984 | Barge | 417/356 |
| 4,489,680 | 12/1984 | Spokas et al. | 123/41.05 |
| 4,539,943 | 9/1985 | Tsuchikawa et al. | 123/41.05 |
| 4,546,742 | 10/1985 | Sturges | 123/41.05 |
| 4,560,110 | 12/1985 | Burda | 241/36 |
| 4,570,849 | 2/1986 | Klaucke et al. | 236/35 |
| 4,650,414 | 3/1987 | Grenfell | 431/5 |
| 4,704,953 | 11/1987 | Wilson | 98/115.2 |
| 4,893,703 | 1/1990 | Kennedy et al. | 192/58 B |
| 4,899,861 | 2/1990 | Cummings, III | 192/85 AA |
| 4,920,929 | 5/1990 | Bishop | 123/41.49 |
| 4,930,460 | 6/1990 | Aihara et al. | 723/41.49 |
| 4,987,986 | 1/1991 | Kennedy et al. | 192/58 B |
| 5,002,019 | 3/1991 | Klaucke et al. | 123/41.49 |
| 5,165,377 | 11/1992 | Hosseini | 123/41.12 |
| 5,224,446 | 7/1993 | Okita et al. | 123/41.12 |
| 5,226,285 | 7/1993 | Dankowski | 62/184 |
| 5,731,975 | 3/1998 | Nakashima | 303/191 |

FOREIGN PATENT DOCUMENTS

| | | | |
|---|---|---|---|
| 4228586-A1 | 8/1993 | Germany | F24F 3/16 |
| 58-205050 | 11/1983 | Japan | F24J 3/02 |
| 59-206923 | 5/1986 | Japan | F28G 1/16 |

*Primary Examiner*—Dirk Wright
*Attorney, Agent, or Firm*—Maginot Addison & Moore

[57] ABSTRACT

A method for retarding a work machine having a fluid-cooled brake system includes the step of advancing said work machine at a first ground speed during a first period of time. The method also includes the step of sensing a fluid temperature of brake coolant circulating through said brake system during the first period of time. The method further includes the step of advancing said work machine at a second ground speed during a second period of time based on said fluid temperature. During retarding of the work machine, the radiator fan is operated at a predetermined, maximum fan speed irrespective of engine speed of the work machine's engine. Moreover, during retarding of the work machine according to the method of the present invention, the circulation pumps of the work machine's brake cooling system are operated at a predetermined, maximum pump speed irrespective of engine speed of the work machine's engine. An apparatus for retarding a work machine is also disclosed.

20 Claims, 4 Drawing Sheets

METHOD AND APPARATUS FOR RETARDING A WORK MACHINE HAVING A FLUID-COOLED BRAKE SYSTEM

This application claims the benefit of U.S. Provisional Application Serial No. 60/102,034, filed Sep. 28, 1998.

TECHNICAL FIELD OF THE INVENTION

The present invention relates generally to a work machine, and more particularly to a method and apparatus for retarding a work machine having a fluid-cooled brake system.

BACKGROUND OF THE INVENTION

Work machines, such as off-highway trucks, are often loaded with heavy payloads and thereafter required to operate over varying terrain. One particularly common scenario is when an off-highway truck is loaded with rock or other material and is thereafter required to traverse a downward grade. Such downward grades can often be relatively steep. For example, travel ways in or out of mining operations commonly have 10% downward grades associated therewith.

On such a steep downward grade, the off-highway truck is retarded in order to keep the truck from overspeeding. In particular, the off-highway truck's brake system is utilized to slow advancement of the truck as it traverses the downward grade. In addition to preventing overspeeding of the truck itself, retarding of the truck is utilized to prevent mechanical damage to the truck. For example, as the off-highway truck advances down the downward grade, engine speed of the truck's engine typically increases due to increasing ground speed of the truck. Hence, if ground speed of the off-highway truck is not retarded to a certain level, the engine may overspeed thereby potentially causing damage thereto. However, during retarding of the off-highway truck, it is desirable to operate the engine at a relatively high engine speed which is within the operating parameters of the engine. This is true since the radiator fan associated with the engine's radiator is driven by the engine. Hence, it is desirable to operate the engine at an engine speed which causes the radiator fan to turn at or near its maximum speed so as to most effectively cool the engine coolant advancing through the radiator.

It should be appreciated that the brake system of the off-highway truck generates relatively large amounts of heat during retarding the truck. In particular, the disc brake assemblies associated with the truck generate relatively large amounts of heat due to the relatively heavy use thereof during retarding of the truck. Hence, a number of off-highway trucks have heretofore been designed with fluid-cooled brake systems. Such fluid-cooled brake systems circulate a brake coolant through a number of coolers and thereafter into contact with the discs of the disc brake assemblies thereby cooling the discs during operation of the off-highway truck. It should be appreciated that it is desirable to operate the circulation pumps associated with the brake cooling system at or near their maximum pump speeds so as to most effectively cool the brake coolant advancing through the brake cooling system.

In order to operate the radiator fan and the circulation pumps of the brake cooling system at or near their maximum speeds, retarding systems which have heretofore been designed typically operate the engine at a predetermined engine speed in order to cause the radiator fan and the circulation pumps of the brake cooling system to be operated at or near their maximum speeds. For example, retarding systems which have heretofore been designed which operate the engine at an engine speed of 1950 revolutions-per-minute (RPM) thereby setting ground speed of the truck in a given gear. Such operation of the engine maintains operation of the radiator fan and the circulation pumps of the brake cooling system at or near their maximum speeds thereby preventing the respective speeds of the radiator fan and the circulation pumps of the brake cooling system from fluctuating due to changes in the ground speed of the off-highway truck.

However, such operation of the engine has a number of drawbacks associated therewith. For example, when operated in such a manner, the truck has a limited number of "set points" in which it may be operated during retarding thereof. In particular, the truck may be operated at the predetermined engine speed (e.g. 1950 RPM) in each of the gears associated with the truck's transmission, but not at any other set points therebetween. For example, the truck may be operated at 1950 RPM in second gear or 1950 RPM in third gear, but could not be operated at 1500 RPM in third gear. Such operation may undesirably reduce the work efficiency of the truck. For instance, as the off-highway truck advances (in a retarding manner) down a downward grade with the truck's transmission in third gear, the truck's engine speed may have a tendency to increase beyond the predetermined engine speed (1950 RPM) due to ground speed of the truck. The brakes are then applied to keep the engine from overspeeding above 1950 RPM. However, the energy put into the cooling system by application of the brakes may be too high for the cooling system to dissipate. Hence, the transmission of the truck must be downshifted to second gear in order to prevent overheating. It should be appreciated that although overheating is alleviated when the transmission is downshifted to second gear, ground speed of the truck is slowed to an undesirable pace which reduces the work efficiency of the truck.

What is needed therefore is a method and apparatus for retarding a work machine which overcomes one or more of the above-mentioned drawbacks.

DISCLOSURE OF THE INVENTION

In accordance with a first embodiment of the present invention, there is provided a method for retarding a work machine having a fluid-cooled brake system. The method includes the step of sensing a fluid temperature of brake coolant circulating through the brake system. The method also includes the step of adjusting ground speed of the work machine based on the fluid temperature.

In accordance with a second embodiment of the present invention, there is provided a method for retarding a work machine having an engine coupled to a transmission. The method includes the step of retarding the work machine so as to advance the work machine at a first ground speed thereby causing the engine to operate at a first engine speed. The transmission of the work machine is operated in a first gear during the first ground speed retarding step. The method also includes the step of retarding the work machine so as to advance the work machine at a second ground speed thereby causing the engine to operate at a second engine speed. The transmission of the work machine is operated in the first gear during the second ground speed retarding step.

In accordance with a third embodiment of the present invention, there is provided a method for retarding a work machine having a fluid-cooled brake system. The method includes the step of advancing the work machine at a first ground speed during a first period of time. The method also includes the step of sensing a fluid temperature of brake coolant circulating through the brake system during the first period of time. The method further includes the step of advancing the work machine at a second ground speed during a second period of time based on the fluid temperature.

In accordance with a fourth embodiment of the present invention, there is provided an apparatus for retarding a work machine. The apparatus includes a fluid-cooled brake system which applies braking force to a wheel assembly of the work machine in order to control ground speed of the work machine. The apparatus also includes a sensor for sensing a fluid temperature of a brake coolant circulating through the fluid-cooled brake system. The apparatus further includes a controller which is configured to adjust braking force applied by the fluid-cooled brake assembly to the wheel assembly of the work machine based on the fluid temperature of the brake coolant whereby ground speed of the work machine is adjusted.

BEST MODE FOR CARRYING OUT THE INVENTION

Figure 1:
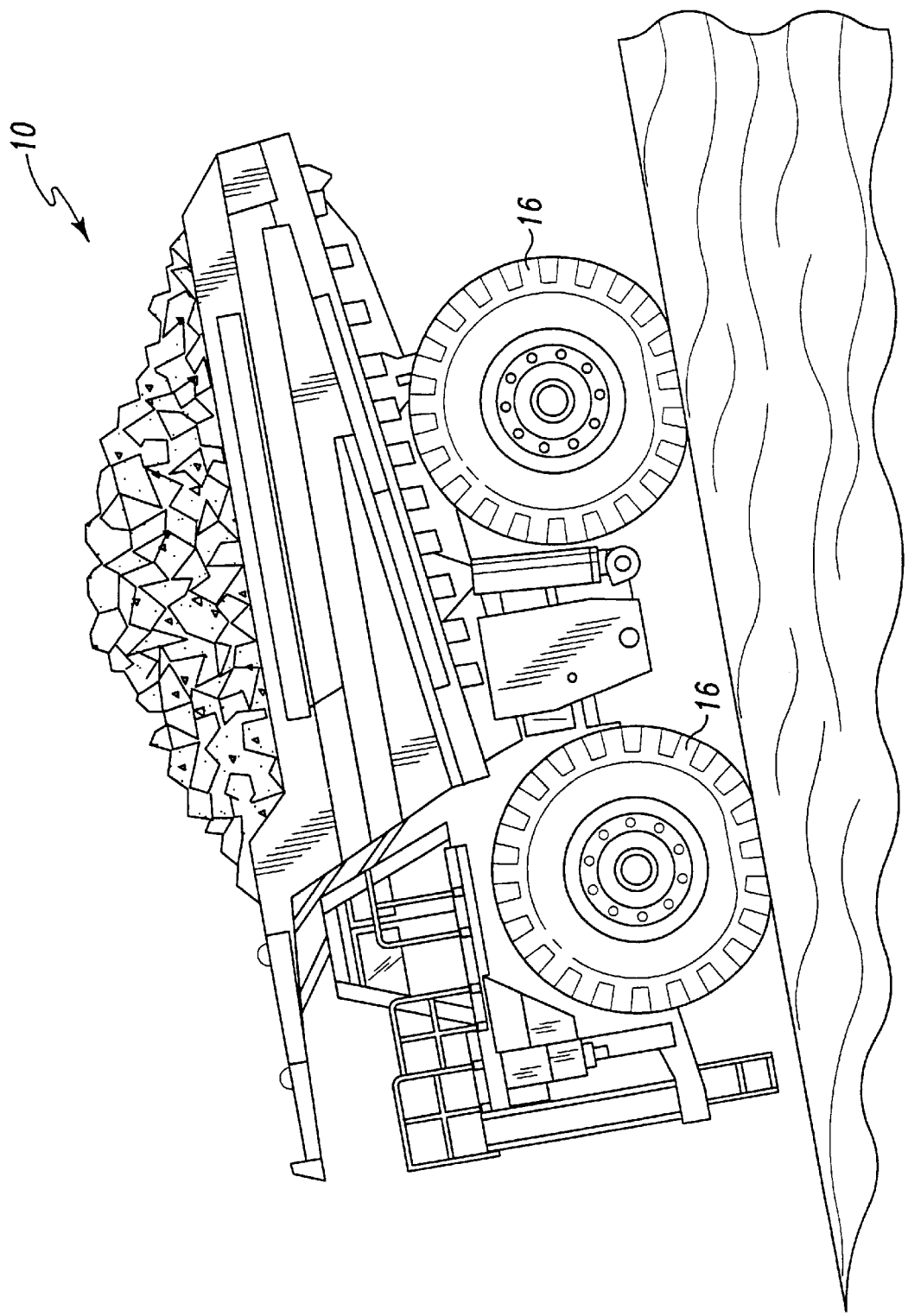
FIG. 1 is an elevational view of a work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
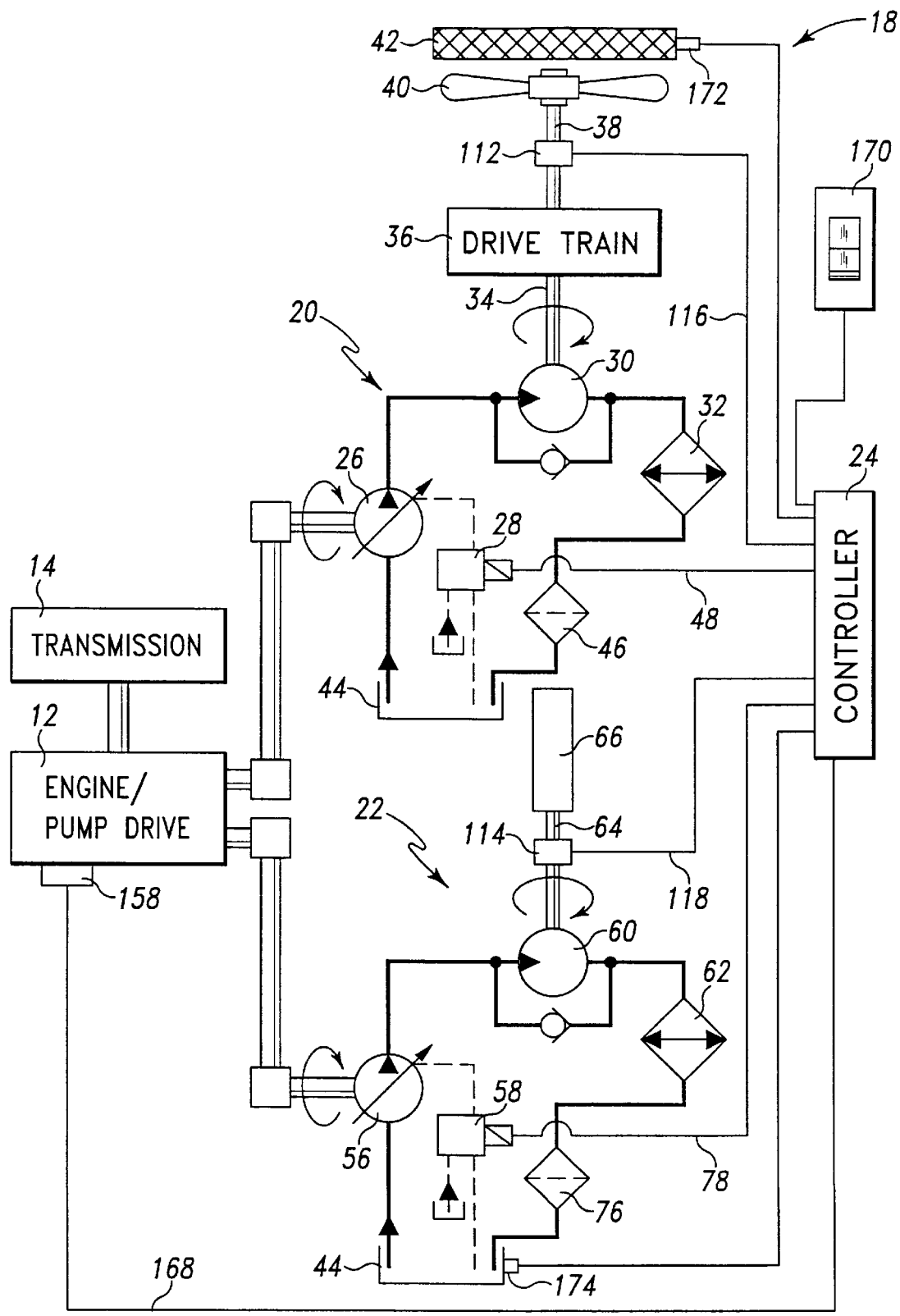
FIG. 2 is a schematic view of the retarding control system of the work machine of FIG. 1.
Figure 3:
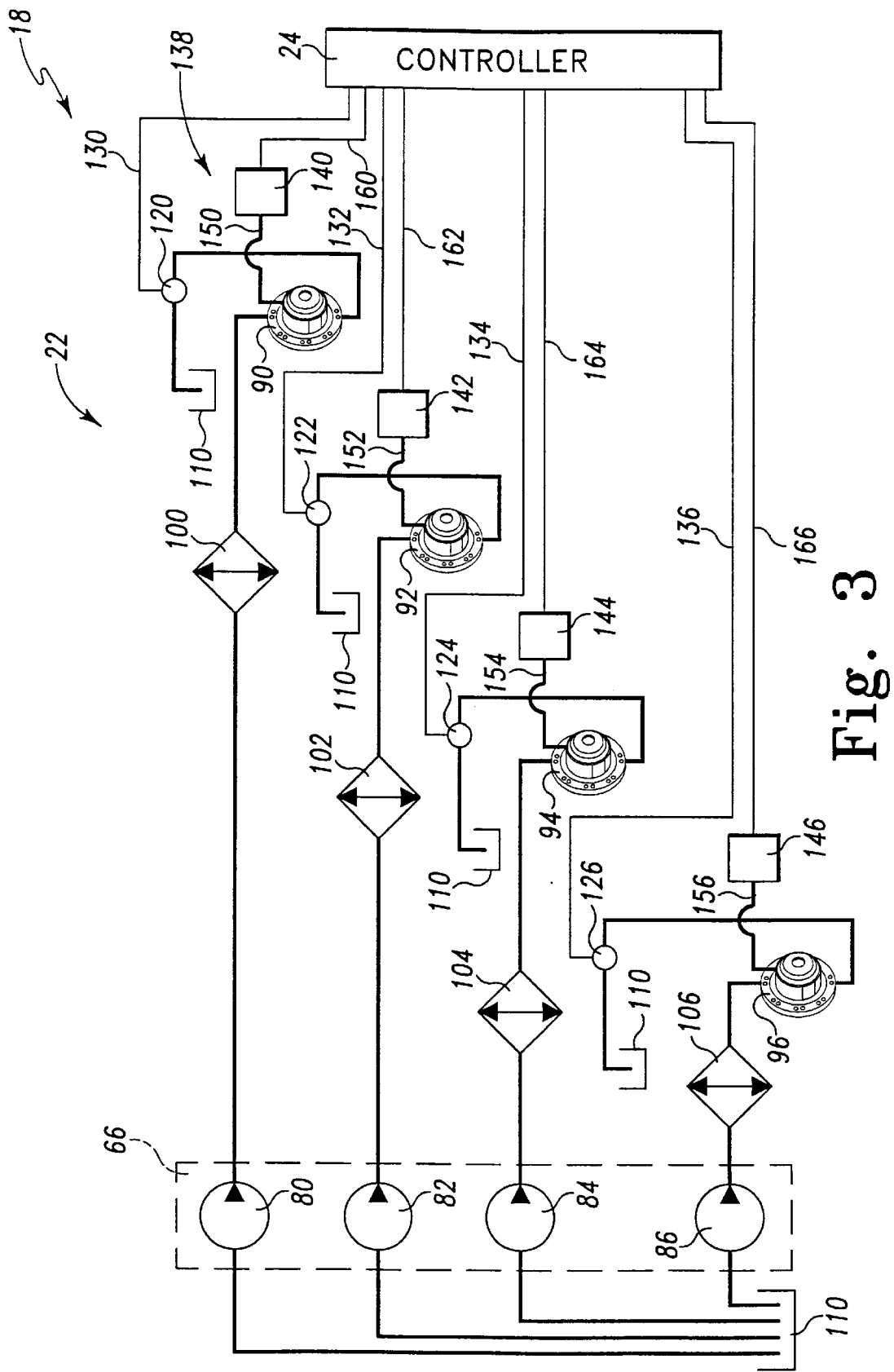
FIG. 3 is a schematic view of the brake cooling system of the retarding control system of FIG. 2.

Referring now to FIGS. 1–3, there is shown a work machine such as an off-highway truck 10. The off-highway truck 10 includes an engine 12 such as a diesel engine which is operatively coupled to a transmission 14 (see FIG. 2). The engine 12 provides the motive power for operation of the off-highway truck 10. In particular, the engine 12 drives the transmission 14 which is in turn coupled to a drive train (not shown) associated with the truck 10 so as to drive a wheel assembly 16 of the truck 10 thereby facilitating advancement thereof. Each of the wheels included in the wheel assembly 16 has a disc brake assembly 90, 92, 94, 96 (see FIG. 3) operatively associated therewith in order to control ground speed of the off-highway truck 10.

In order to facilitate retarding of the truck 10, the truck includes a retarding control system 18, as shown in FIG. 2. The retarding control system 18 includes a radiator fan system 20, a brake cooling system 22, and a controller 24. As shall be discussed below in more detail, the controller 24 controls the radiator fan system 20 and the brake cooling system 22 at a predetermined, maximum output level irrespective of engine speed of the engine 12.

The radiator fan system 20 includes a variable displacement hydraulic pump 26, a pump control valve 28, a constant speed hydraulic motor 30, and a fluid cooler 32. The hydraulic pump 26 is fluidly coupled to the hydraulic motor 30 so as to provide fluid pressure for driving the hydraulic motor 30. In particular, the hydraulic pump 26 is driven by the engine 12 of the truck 10 in order to create fluid pressure therewith. Such fluid pressure is communicated to the hydraulic motor 30 which causes an output shaft 34 thereof to be rotated. The output shaft 34 is coupled to a drive train 36, the output of which is coupled to a drive shaft 38 of a radiator fan 40. The radiator fan 40 cooperates with a radiator 42 to cool the engine 12 during operation thereof. In particular, rotation of the radiator fan 40 advances air across the fins and vanes (not shown) associated with the radiator 42 thereby cooling the engine coolant advancing therethrough.

The inlet of the hydraulic pump 26 is fluidly coupled to a reservoir 44. Hence, hydraulic fluid is drawn from the reservoir 44 by the hydraulic pump 26 and advanced to the hydraulic motor 30. Exhausted hydraulic fluid is advanced out of the hydraulic motor 30 and into the fluid cooler 32 thereby cooling the exhausted hydraulic fluid. Thereafter, the hydraulic fluid is filtered by a filter 46 and returned to the reservoir 44.

The displacement of the hydraulic pump 26 is controlled by the position of pump control valve 28. In particular, absent control by the pump control valve 28, flow and hence output of the hydraulic pump 26 varies with fluctuations in engine speed of the engine 12. In particular, as engine speed of the engine 12 increases, flow of the hydraulic pump 26 and hence rotational fan speed of the radiator fan 40 likewise increases. Conversely, as engine speed of the engine 12 decreases, flow of the hydraulic pump 26 and hence rotational fan speed of the radiator fan 40 likewise decreases. The pump control valve 28 prevents such changes in flow of the hydraulic pump 26. In particular, the pump control valve 28 is preferably embodied as a solenoid-controlled pump control valve which is electrically coupled to the controller 24 via a signal line 48. The position of the pump control valve 28 determines or otherwise controls displacement of the hydraulic pump 26. Hence, the controller 24 may selectively adjust the position of the solenoid-controlled pump control valve 28 in order to maintain constant flow of the hydraulic pump 26 thereby causing the output shaft 34 of the hydraulic motor 30 to rotate at a constant speed irrespective of engine speed of the engine 12.

The brake cooling system 22 includes a variable displacement hydraulic pump 56, a pump control valve 58, a constant speed hydraulic motor 60, and a fluid cooler 62. The hydraulic pump 56 is fluidly coupled to the hydraulic motor 60 so as to provide fluid pressure for driving the hydraulic motor 60. In particular, as with the hydraulic pump 26 of the radiator fan system 20, the hydraulic pump 56 is driven by the engine 12 of the truck 10 in order to create fluid pressure therewith. Such fluid pressure is communicated to the hydraulic motor 60 which causes an output shaft 64 thereof to be rotated. The output shaft 64 is coupled to a brake circulation pump assembly 66. As will be discussed below in regard to FIG. 3, the brake circulation pump assembly 66 includes a number of coolant circulation pumps 80, 82, 84, 86 which operate to circulate brake coolant from the disc brake assemblies 90, 92, 94, 96 through a number of fluid coolers 100, 102, 104, 106 thereby cooling the brake coolant.

The inlet of the hydraulic pump 56 is fluidly coupled to the reservoir 44. Hence, hydraulic fluid is drawn from the reservoir 44 by the hydraulic pump 56 and advanced to the hydraulic motor 60. Exhausted hydraulic fluid is advanced out of the hydraulic motor 60 and into the fluid cooler 62 thereby cooling the exhausted hydraulic fluid. Thereafter, the hydraulic fluid is filtered by a filter 76 and returned to the reservoir 44.

The displacement of the hydraulic pump 56 is controlled by the position of pump control valve 58. In particular, absent control by the pump control valve 58, flow and hence output of the hydraulic pump 56 varies with fluctuations in engine speed of the engine 12. In particular, as engine speed of the engine 12 increases, flow of the hydraulic pump 56 and hence output of the brake circulation pump assembly 66 likewise increases. Conversely, as engine speed of the engine 12 decreases, flow of the hydraulic pump 56 and hence output of the brake circulation pump assembly 66 likewise decreases. The pump control valve 58 prevents such changes in flow of the hydraulic pump 56. In particular, as with the pump control valve 28 of the radiator fan system 20, the pump control valve 58 is preferably embodied as a solenoid-controlled pump control valve which is electrically coupled to the controller 24 via a signal line 78. The position of the pump control valve 58 determines or otherwise controls displacement of the hydraulic pump 56. Hence, the controller 24 may selectively adjust the position of the solenoid-controlled pump control valve 58 in order to maintain constant flow of the hydraulic pump 56 thereby causing the output shaft 64 of the hydraulic motor 60 to rotate at a constant speed irrespective of engine speed of the engine 12.

As shown in FIG. 3, the brake cooling system 22 includes the brake circulation pump assembly 66 and the fluid coolers 100, 102, 104, 106. The brake circulation pump assembly 66 provides fluid pressure to circulate brake coolant through the fluid coolers 100, 102, 104, 106 in order to cool the disc brake assemblies 90, 92, 94, 96 associated with the off-highway truck 10. In particular, the brake circulation pump assembly 66 includes the circulation pumps 80, 82, 84, 86, each of which is driven by the output shaft 64 of the hydraulic motor 60. The inlet of the circulation pump 80 is coupled to a brake coolant reservoir 110, whereas the outlet of the circulation pump 80 is fluidly coupled to the inlet of the fluid cooler 100. The outlet of the fluid cooler 100 is fluidly coupled to the coolant inlet of the disc brake assembly 90. The coolant outlet of the disc brake assembly 90 is in turn fluidly coupled to the reservoir 110. Hence, brake coolant is advanced by the circulation pump 80 from the reservoir 110, through the fluid cooler 100, the disc brake assembly 90, and thereafter returned to the reservoir 110. It should be appreciated that brake coolant advancing through the disc brake assembly 90 is impinged upon the disc associated therewith thereby cooling the disc during operation of the off-highway truck 10.

Similarly, the inlet of the circulation pump 82 is coupled to the brake coolant reservoir 110, whereas the outlet of the circulation pump 82 is fluidly coupled to the inlet of the fluid cooler 102. The outlet of the fluid cooler 102 is fluidly coupled to the coolant inlet of the disc brake assembly 92. The coolant outlet of the disc brake assembly 92 is in turn fluidly coupled to the reservoir 110. Hence, brake coolant is advanced by the circulation pump 82 from the reservoir 110, through the fluid cooler 102, the disc brake assembly 92, and thereafter returned to the reservoir 110. It should be appreciated that brake coolant advancing through the disc brake assembly 92 is impinged upon the disc associated therewith thereby cooling the disc during operation of the off-highway truck 10.

Moreover, the inlet of the circulation pump 84 is coupled to the brake coolant reservoir 110, whereas the outlet of the circulation pump 84 is fluidly coupled to the inlet of the fluid cooler 104. The outlet of the fluid cooler 104 is fluidly coupled to the coolant inlet of the disc brake assembly 94. The coolant outlet of the disc brake assembly 94 is in turn fluidly coupled to the reservoir 110. Hence, brake coolant is advanced by the circulation pump 84 from the reservoir 110, through the fluid cooler 104, the disc brake assembly 94, and thereafter returned to the reservoir 110. It should be appreciated that brake coolant advancing through the disc brake assembly 94 is impinged upon the disc associated therewith thereby cooling the disc during operation of the off-highway truck 10.

Yet further, the inlet of the circulation pump 86 is coupled to the brake coolant reservoir 110, whereas the outlet of the circulation pump 86 is fluidly coupled to the inlet of the fluid cooler 106. The outlet of the fluid cooler 106 is fluidly coupled to the coolant inlet of the disc brake assembly 96. The coolant outlet of the disc brake assembly 96 is in turn fluidly coupled to the reservoir 110. Hence, brake coolant is advanced by the circulation pump 86 from the reservoir 110, through the fluid cooler 106, the disc brake assembly 96, and thereafter returned to the reservoir 110. It should be appreciated that brake coolant advancing through the disc brake assembly 96 is impinged upon the disc associated therewith thereby cooling the disc during operation of the off-highway truck 10.

The controller 24 is provided to control operation of the retarding control system 18 during operation of the off-highway truck 10. The controller 24 utilizes input from a number of sensors associated with the retarding control system 18 in order to control retarding of the off-highway truck 10. In particular, the retarding control system 18 includes a pair of speed sensors 112, 114. The speed sensor 112 is operatively coupled to the drive shaft 38 of the radiator fan 40, whereas the speed sensor 114 is operatively coupled to the output shaft 64 of the hydraulic motor 60. The speed sensors 112, 114 are provided to enable closed-loop control of fan speed of the radiator fan 40 and pump speed of the circulation pumps 80, 82, 84, 86 of the circulation pump assembly 66. In particular, during retarding of the off-highway truck 10, the speed sensor 112 monitors the rotational fan speed of the radiator fan 40 and communicates the same to the controller 24 via a signal line 116. The controller 24 then determines if the sensed fan speed equals a predetermined, maximum fan speed which corresponds to a predetermined air flow rate across the radiator 42. If the sensed fan speed is less than the maximum fan speed, the controller 24 adjusts the position of the pump control valve 28 in order to increase displacement of the hydraulic pump 26 thereby increasing output speed of the hydraulic motor 30 which in turn increases rotational speed of the drive shaft 38 and hence the radiator fan 40. Conversely, if the sensed fan speed is greater than the maximum fan speed, the controller 24 adjusts the position of the pump control valve 28 in order to decrease displacement of the hydraulic pump 26 thereby decreasing output speed of the hydraulic motor 30 which in turn decreases the rotational speed of the drive shaft 40 and hence the radiator fan 40. It should be appreciated that such closed-loop control facilitates operation of the radiator fan 38 at a substantially constant, maximum fan speed irrespective of engine speed of the engine 12.

Similarly, during retarding of the off-highway truck 10, the speed sensor 114 monitors the rotational speed of the output shaft 64 of the hydraulic motor 60 and communicates the same to the controller 24 via a signal line 118. It should be appreciated that rotational speed of the output shaft 64 is indicative of pump speed of the circulation pumps 80, 82, 84, 86. Once rotational speed of the output shaft 64 is communicated to the controller 24, the controller 24 then determines if the sensed pump speed equals a predetermined, maximum pump speed which corresponds to a predetermined brake coolant flow rate through the disc brake assemblies 90, 92, 94, 96. If the sensed pump speed is less than the maximum pump speed, the controller 24 adjusts the position of the pump control valve 58 in order to increase displacement of the hydraulic pump 56 thereby increasing output speed of the hydraulic motor 60 which in turn increases the rotational speed of the output shaft 64 and hence pump speed of the circulation pumps 80, 82, 84, 86. Conversely, if the sensed pump speed is greater than the maximum pump speed, the controller 24 adjusts the position of the pump control valve 58 in order to decrease displacement of the hydraulic pump 56 thereby decreasing output speed of the hydraulic motor 60 which in turn decreases rotational speed of the output shaft 64 and hence pump speed of the circulation pumps 80, 82, 84, 86. It should be appreciated that such closed-loop control facilitates operation of the circulation pumps 80, 82, 84, 86 at a substantially constant, maximum pump speed irrespective of engine speed of the engine 12.

The retarding control system 18 also includes a number of fluid temperature sensors 120, 122, 124, 126 which are provided to sense or otherwise detect fluid temperature of the brake coolant exiting the disc brake assemblies 90, 92, 94, 96, respectively. In particular, the temperature sensor 120 is positioned to sense fluid temperature of spent or exhausted brake coolant exiting the disc brake assembly 90 en route to the reservoir 110. The temperature sensor 120 communicates with the controller 24 via a signal line 130. Similarly, the temperature sensor 122 is positioned to sense fluid temperature of exhausted brake coolant exiting the disc brake assembly 92 en route to the reservoir 110. The temperature sensor 122 communicates with the controller 24 via a signal line 132. The temperature sensor 124 is positioned to sense fluid temperature of exhausted brake coolant exiting the disc brake assembly 94 en route to the reservoir 110. The temperature sensor 124 communicates with the controller 24 via a signal line 134. Moreover, the temperature sensor 126 is positioned to sense fluid temperature of exhausted brake coolant exiting the disc brake assembly 96 en route to the reservoir 110. The temperature sensor 126 communicates with the controller 24 via a signal line 136.

The sensed fluid temperatures of the exhausted brake coolant exiting the disc brake assemblies 90, 92, 94, 96 is utilized by the controller 24 to control ground speed of the off-highway truck 10 during retarding thereof. In particular, the off-highway truck 10 includes a brake control system 138 which controls actuation and deactuation of the disc brake assemblies 90, 92, 94, 96. In a known manner, an increase in the amount of braking force generated by the disc brake assemblies 90, 92, 94, 96 slows or otherwise reduces ground speed of the off-highway truck 10, whereas a decrease in the amount of braking force generated by the disc brake assemblies 90, 92, 94, 96 increases ground speed of the off-highway truck 10. Each of the disc brake assemblies 90, 92, 94, 96 has an actuator 140, 142, 144, 146, respectively, associated therewith. The actuators 140, 142, 144, 146 are fluidly coupled to a pressurized hydraulic fluid source (not shown) and include the hardware necessary to selectively transmit fluid pressure to the disc brake assemblies 90, 92, 94, 96, via a number of fluid lines 150, 152, 154, 156, respectively, thereby selectively actuating and deactuating the disc brake assemblies 90, 92, 94, 96. Moreover, the actuators 140, 142, 144, 146 are electrically coupled to the controller 24 via a number of signal lines 160, 162, 164, 166, respectively, in order to receive brake control signals therefrom. Hence, brake control signals generated by the controller 24 and communicated on the signal lines 160, 162, 164, 166 selectively increase or decrease the amount of braking force generated by the corresponding disc brake assemblies 90, 92, 94, 96 thereby adjusting (i.e. selectively reducing or increasing) ground speed of the off-highway truck 10.

During retarding of the off-highway truck 10, the controller 24 monitors fluid temperature of the exhausted brake coolant exiting the disc brake assemblies 90, 92, 94, 96. If the sensed fluid temperature is within a predetermined temperature range, the controller 24 continues retarding the off-highway truck 10 at the truck's current ground speed. However, if the sensed fluid temperature is above or otherwise exceeds the predetermined temperature range, the controller 24 generates brake output signals on the signal lines 160, 162, 164, 166 which cause a temporary increase in the amount of braking force generated by the disc brake assemblies 90, 92, 94, 96 which in turn reduces ground speed of the off-highway truck 10. It should be appreciated that such a reduction in ground speed of the off-highway truck 10 reduces the amount of heat which must be removed from the disc brake assemblies 90, 92, 94, 96 by the brake cooling system 22 thereby reducing fluid temperature of the brake coolant to a temperature within the predetermined temperature range. It should further be appreciated that the controller 24 continues to reduce the ground speed of the off-highway truck 10 until fluid temperature of the brake coolant is within the predetermined temperature range. It should be noted that if the off-way truck 10 is slowed to a ground speed which is below a predetermined limit, the controller 24 may cause the transmission 14 to be downshifted to the next lower gear. The controller 24 would then commence monitoring of fluid temperature of the brake coolant in order to adjust ground speed of the truck 10 in the lower gear.

Conversely, if the sensed fluid temperature of the brake coolant is below the predetermined temperature range, the controller 24 generates brake output signals on the signal lines 160, 162, 164, 166 which temporarily decrease the amount of braking force generated by the disc brake assemblies 90, 92, 94, 96 which in turn increases ground speed of the off-highway truck 10 thereby allowing the truck 10 to traverse the downward grade at a more efficient (i.e. greater) speed. It should be appreciated that such an increase in ground speed of the off-highway truck 10 increases the amount of heat which must be removed from the disc brake assemblies 90, 92, 94, 96 by the brake cooling system 22 thereby increasing fluid temperature of the brake coolant to a temperature within the predetermined temperature range. It should further be appreciated that the controller 24 continues to increase ground speed of the off-highway truck 10 until either fluid temperature of the brake coolant is within the predetermined temperature range, or engine speed of the engine 12 exceeds a predetermined maximum engine speed (as detected by an engine speed sensor 158 coupled to the controller via signal line 168 as shown in FIG. 2).

It should also be appreciated that the retarding control system 18, as described herein, may be utilized when operating the off-highway truck in either a manual retarding mode of operation or an automatic retarding mode of operation. In regard to operation of the off-highway truck 10 in a manual retarding mode of operation in which an operator of the truck 10 controls the retarding of the truck 10 via the controls in the cab of the truck 10, the retarding system 18 allows the operator to efficiently traverse the downward grade. In particular, the radiator fan 40 may be operated at its predetermined, maximum fan speed while the circulation pumps 80, 82, 84, 86 of the brake cooling system 22 are operated at their respective predetermined, maximum pump speeds thereby providing for relatively large amounts of heat removal from the engine 12 and the disc brake assemblies 90, 92, 94, 96 irrespective of engine speed of the engine 12. This allows the operator to adjust the ground speed of the off-highway truck 10 within a particular gear (e.g. third gear of the transmission 14) thereby allowing the operator to determine an "ideal" ground speed for advancement of the truck 10. It should be appreciated that the sensed fluid temperature of the brake coolant (as detected by the temperature sensors 120, 122, 124, 126) may be displayed for use by the operator when operating the truck 10 in the manual retarding mode of operation via use of known temperature gauges located in the cab of the truck 10.

Moreover, if a particular off-highway truck 10 is equipped with an automatic retarding system, the retarding control system 18 of the present invention may be utilized to cooperate with the automatic retarding system to facilitate efficient retarding of the truck 10. Such automatic retarding systems are typically controlled (i.e. toggled on and off) via a switch mounted in the cab of the truck 10. Hence, as shown in FIG. 2, the position of an automatic retarding switch 170 may be monitored by the controller 24 in order to operate the retarding system 18 of the present invention in conjunction with the automatic retarding system of the truck 10.

Moreover, it should be appreciated that the controller 24 may be utilized to monitor numerous other operating parameters associated with the retarding control system 18. For example, the controller may monitor the output of a temperature sensor 172 in order to monitor the temperature of engine coolant circulating through the radiator 42. Moreover, the controller may monitor the output of a temperature sensor 174 in order to monitor fluid temperature of hydraulic fluid present in the reservoir 44.

It should also be appreciated that when the off-highway truck 10 is operating in a non-retarding mode of operation (i.e. when the truck 10 is not traversing a downward grade), the radiator fan 40 and the circulation pumps 80, 82, 84,86 may be controlled at speeds other than their respective maximum speeds. For example, fan speed of the radiator fan 40 may be controlled at a speed which is dependent on, for example, engine speed of the engine 12 or fluid temperature of the engine coolant in the radiator 42. Moreover, fan speed of the radiator fan 40 may be controlled at a relatively slow fan speed when the off-highway truck 10 is moving at a relatively slow ground speed (e.g. <4 mph) or idling thereby reducing noise associated with operation of the radiator fan 40. Similarly, when the off-highway truck 10 is operating in the non-retarding mode of operation, pump speed of the circulation pumps 80, 82, 84, 86 may be controlled at a speed which is dependent on, for example, engine speed of the engine 12 or fluid temperature of the brake coolant circulating through the brake cooling system 22.

INDUSTRIAL APPLICABILITY

Figure 4:
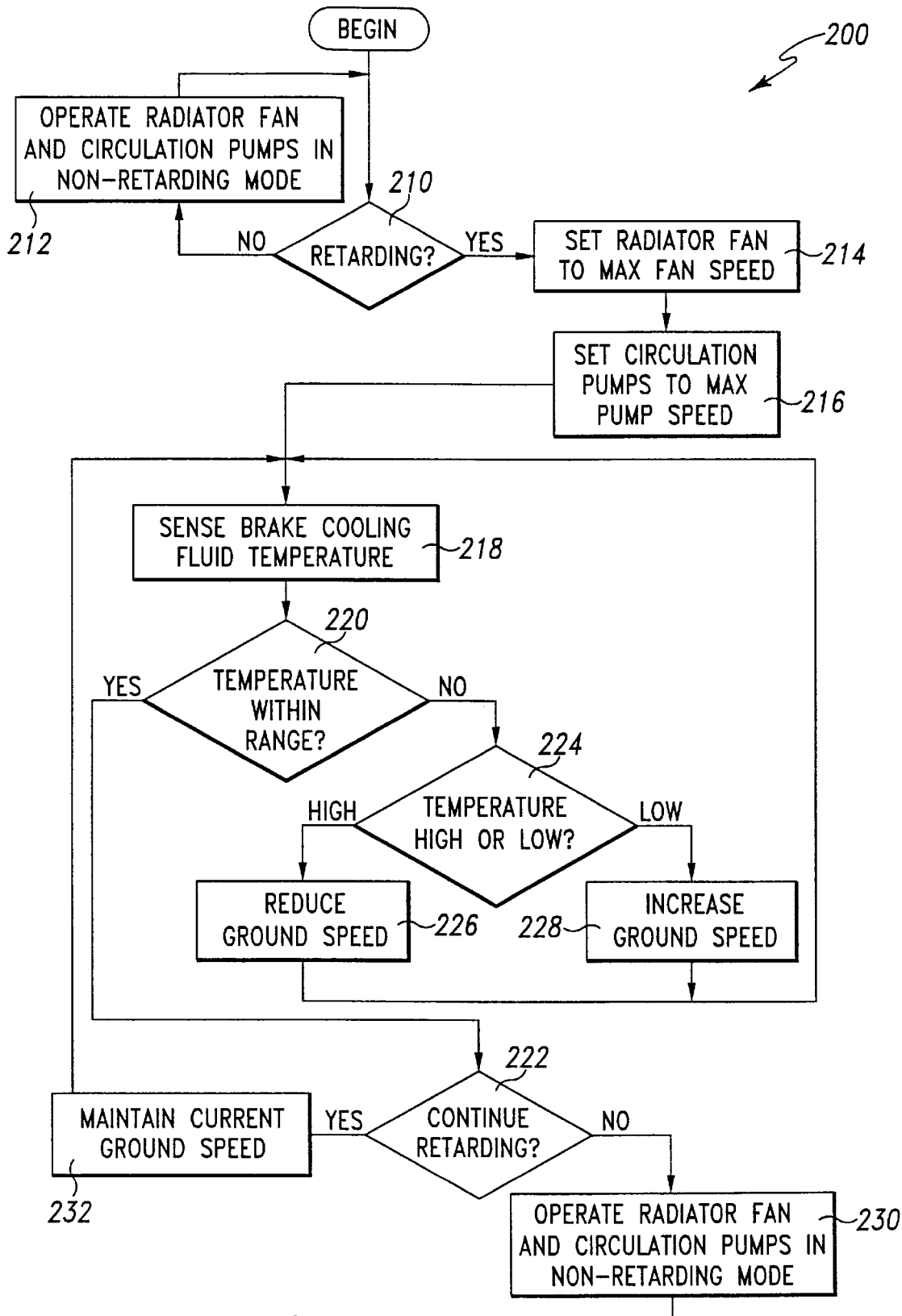
FIG. 4 is a flowchart which shows a general procedure for retarding the work machine of FIG. 1.

In operation, during retarding of the off-highway truck 10, the controller 24 monitors fluid temperature of the brake coolant circulating through the brake cooling system 22 in order to control ground speed of the truck 10. Referring now to FIG. 4, there is shown a general procedure or routine 200 for retarding the off-highway truck 10.

The routine 200 begins with step 210 in which the controller 24 determines if the operator of the off-highway truck 10 is operating the truck 10 in a retarding mode of operation. In particular, the operator may be operating the off-highway truck in the manual retarding mode of operation, or may have actuated the truck's automatic retarding system (if the truck 10 is so equipped) by toggling the automatic retarding switch 170. If the controller 24 determines that the off-highway truck 10 is not being operated in a retarding mode of operation (either manual or automatic), the routine 200 advances to step 212. However, if the controller 24 determines that the off-highway truck 10 is being operated in a retarding mode of operation, the routine 200 advances to step 214.

In step 212, the controller 24 causes the radiator fan 40 and the circulation pumps 80, 82, 84, 86 to be operated in the non-retarding mode of operation. In particular, as discussed above, when the off-highway truck 10 is operating in a non-retarding mode of operation (i.e. when the truck 10 is not traversing a downward grade), the radiator fan 40 and the circulation pumps 80, 82, 84,86 may be controlled at speeds other than their respective maximum speeds. For example, fan speed of the radiator fan 40 may be controlled at a speed which is dependent on, for example, engine speed of the engine 12 or fluid temperature of the engine coolant in the radiator 42. Moreover, fan speed of the radiator fan 40 may be controlled at a relatively slow fan speed when the off-highway truck 10 is moving at a relatively slow ground speed (e.g. <4 mph) or idling thereby reducing noise associated with operation of the radiator fan 40. Similarly, when the off-highway truck 10 is operating in the non-retarding mode of operation, pump speed of the circulation pumps 80, 82, 84, 86 may be controlled at a speed which is dependent on, for example, engine speed of the engine 12 or fluid temperature of the brake coolant circulating through the brake cooling system 22. The routine 200 then loops back to step 210 in order to determine if the truck 10 is subsequently operated in the retarding mode of operation by the operator.

Referring back to step 210, if the controller 24 determines that the off-highway truck 10 is being operated in a retarding mode of operation, the routine 200 advances to step 214. In step 214, the controller 24 causes the radiator fan 40 to be operated at its predetermined, maximum fan speed. In particular, the controller generates an output signal on the signal line 48 (see FIG. 2) which causes the solenoid-controlled pump control valve 28 to be positioned in a position which increases the displacement of the hydraulic pump 26. Such an increase in displacement of the hydraulic pump 26 increases the output of the hydraulic motor 30. The displacement of the hydraulic pump 26 is increased to a predetermined level which causes the hydraulic motor 30 to drive the radiator fan 40 at its maximum fan speed. The routine 200 then advances to step 216.

In step 216, the controller 24 causes the circulation pumps 80, 82, 84, 86 to be operated at their respective predetermined, maximum pump speeds. In particular, the controller generates an output signal on the signal line 78 (see FIG. 2) which causes the solenoid-controlled pump control valve 58 to be positioned in a position which increases the displacement of the hydraulic pump 56. Such an increase in displacement of the hydraulic pump 56 increases the output of the hydraulic motor 60. The displacement of the hydraulic pump 56 is increased to a predetermined level which causes the hydraulic motor 60 to drive the circulation pumps 80, 82, 84, 86 at their respective maximum pump speeds. The routine 200 then advances to step 218.

In step 218, the controller 24 determines fluid temperature of the brake coolant in the brake cooling system 22. In particular, the controller 24 scans or otherwise reads the signal lines 130, 132, 134, 136 in order to determine fluid temperature of the brake coolant as detected by the temperature sensors 120, 122, 124, 126, respectively. The routine 200 then advances to step 220.

In step 220, the controller 24 determines if fluid temperature of the brake coolant (as sensed in step 218) is within a predetermined temperature range. If fluid temperature of the brake coolant is within the predetermined temperature range, the routine 200 advances to step 222. If fluid temperature of the brake coolant is not within the predetermined temperature range, the routine 200 advances to step 224.

In step 222, the controller 24 determines if the operator of the off-highway truck 10 is continuing to operate the truck 10 in the retarding mode of operation. In particular, the controller 24 determines if the operator is continuing to either operate the off-highway truck 10 in the manual retarding mode of operation, or continues to have the truck's automatic retarding system (if the truck 10 is so equipped) actuated. If the controller 24 determines that the off-highway truck 10 is no longer being operated in a retarding mode of operation (either manual or automatic), the routine 200 advances to step 230. However, if the controller 24 determines that the off-highway truck 10 is continuing to be operated in a retarding mode of operation, the routine 200 advances to step 232.

In step 230, the controller 24 causes the radiator fan 40 and the circulation pumps 80, 82, 84, 36 to be operated in the non-retarding mode of operation. In particular, as discussed above, when the off-highway truck 10 is operating in a non-retarding mode of operation (i.e. when the truck 10 is not traversing a downward grade), the radiator fan 40 and the circulation pumps 80, 82, 84, 86 may be controlled at speeds other than their respective maximum speeds. For example, fan speed of the radiator fan 40 may be controlled at a speed which is dependent on, for example, engine speed of the engine 12 or fluid temperature of the engine coolant in the radiator 42. Moreover, fan speed of the radiator fan 40 may be controlled at a relatively slow fan speed when the off-highway truck 10 is moving at a relatively slow ground speed (e.g. <4 mph) or idling thereby reducing noise associated with operation of the radiator fan 40. Similarly, when the off-highway truck 10 is operating in the non-retarding mode of operation, pump speed of the circulation pumps 80, 82, 84, 86 may be controlled at a speed which is dependent on, for example, engine speed of the engine 12 or fluid temperature of the brake coolant circulating through the brake cooling system 22. The routine 200 then ends thereby maintaining operation of the radiator fan 40 and the circulation pumps 80, 82, 84, 86 in the non-retarding mode of operation until the operator of the off-highway truck 10 subsequently places the truck 10 in the retarding mode of operation.

Returning now to step 222, if the controller 24 determines that the off-highway truck 10 is continuing to be operated in a retarding mode of operation, the routine 200 advances to step 232. In step 232, the controller 24 causes the off-highway truck 10 to be maintained at its current ground speed. In particular, the controller 24 communicates with the brake actuators 140, 142, 144, 146 so as to maintain the current level of braking force being generated by the disc brake assemblies 90, 92, 94, 96 thereby maintaining the current ground speed of the truck 10. The routine 200 then loops back to step 218 to further monitor fluid temperature of the brake coolant during continuing retarding of the off-highway truck 10.

Returning now to step 220, if fluid temperature of the brake coolant is not within the predetermined temperature range, the routine 200 advances to step 224. In step 224, the controller 24 determines if fluid temperature of the brake coolant is either above or below the predetermined temperature range. If the fluid temperature of the brake coolant is high or otherwise above the predetermined temperature range, the routine 200 advances to step 226. If fluid temperature of the brake coolant is low or otherwise below the predetermined temperature range, the routine 200 advances to step 228.

In step 226, the controller 24 reduces ground speed of the off-highway truck 10. In particular, the controller 24 generates brake output signals on the signal lines 160, 162, 164, 166 which temporarily increase the amount of braking force generated by the disc brake assemblies 90, 92, 94, 96 which in turn reduces ground speed of the off-highway truck 10. It should be appreciated that such a reduction in ground speed of the off-highway truck 10 reduces the amount of heat which must be removed from the disc brake assemblies 90, 92, 94, 96 by the brake cooling system 22 thereby reducing fluid temperature of the brake coolant. It should be noted that if the off-way truck 10 is slowed to a ground speed which is below a predetermined limit, the controller 24 may cause the transmission 14 to be downshifted to the next lower gear. The routine 200 then loops back to step 218 to further monitor fluid temperature of the brake coolant during continuing retarding of the off-highway truck 10.

Returning now to step 224, if fluid temperature of the brake coolant is below the predetermined temperature range, the routine 200 advances to step 228. In step 228, the controller 24 increases ground speed of the off-highway truck 10. In particular, the controller 24 generates brake output signals on the signal lines 160, 162, 164, 166 which temporarily decrease the amount of braking force generated by the disc brake assemblies 90, 92, 94, 96 which in turn increases ground speed of the off-highway truck 10 thereby allowing the truck 10 to traverse the downward grade at a more efficient (i.e. greater) speed. It should be appreciated that such an increase in ground speed of the off-highway truck 10 increases the amount of heat which must be removed from the disc brake assemblies 90, 92, 94, 96 by the brake cooling system 22 thereby increasing fluid temperature of the brake coolant. The routine 200 then loops back to step 218 to further monitor fluid temperature of the brake coolant during continuing retarding of the off-highway truck 10.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for retarding a work machine having a fluid-cooled brake system, comprising the steps of:

sensing a fluid temperature of brake coolant circulating through said brake system; and adjusting ground speed of said work machine based on said fluid temperature.

2. The method of claim 1, further comprising the step of determining if said fluid temperature is within a predetermined temperature range, wherein:

said adjusting step includes the step of decreasing said ground speed of said work machine if said fluid temperature is above said predetermined temperature range.

3. The method of claim 1, further comprising the step of determining if said fluid temperature is within a predetermined temperature range, wherein:

said adjusting step includes the step of increasing said ground speed of said work machine if said fluid temperature is below said predetermined temperature range.

4. The method of claim 1, wherein said work machine further has a radiator fan for cooling engine coolant advancing through a radiator, further comprising the step of:

operating said radiator fan at a substantially constant fan speed during said adjusting step.

5. The method of claim 1, wherein said work machine further has a cooling pump for advancing said brake coolant through said brake system, further comprising the step of:

operating said brake cooling pump at a substantially constant pump speed during said adjusting step.

6. A method for retarding a work machine having an engine coupled to a transmission, comprising the steps of:

retarding said work machine so as to advance said work machine at a first ground speed thereby causing said engine to operate at a first engine speed, wherein said transmission of said work machine is operated in a first gear during said first ground speed retarding step; and retarding said work machine so as to advance said work machine at a second ground speed thereby causing said engine to operate at a second engine speed, wherein said transmission of said work machine is operated in said first gear during said second ground speed retarding step.

7. The method of claim 6, wherein said work machine further has a fluid-cooled brake system, comprising the steps of:

sensing a fluid temperature of brake coolant circulating through said brake system;

determining if said fluid temperature is within a predetermined temperature range; and retarding said work machine so as to advance said work machine at said first ground speed if said fluid temperature is within said predetermined temperature range.

8. The method of claim 7, further comprising the step of retarding said work machine so as to advance said work machine at said second ground speed if said fluid temperature is outside said predetermined temperature range.

9. The method of claim 8, wherein:

said step of retarding said work machine so as to advance said work machine at said second ground speed if said fluid temperature is outside said predetermined temperature range includes the step of retarding said work machine so as to advance said work machine at said second ground speed if said fluid temperature is above said predetermined temperature range, and said second ground speed is less than said first ground speed.

10. The method of claim 8, wherein:

said step of retarding said work machine so as to advance said work machine at said second ground speed if said fluid temperature is outside said predetermined temperature range includes the step of retarding said work machine so as to advance said work machine at said second ground speed if said fluid temperature is below said predetermined temperature range, and said second ground speed is greater than said first ground speed.

11. The method of claim 6, wherein said work machine further has a radiator fan for cooling engine coolant advancing through a radiator, further comprising the step of:

operating said radiator fan at a substantially constant fan speed during both said first and second retarding steps.

12. The method of claim 6, wherein said work machine further has (i) a fluid-cooled brake system, and (ii) a cooling pump for advancing brake coolant through said brake system, further comprising the step of:

operating said brake cooling pump at a substantially constant pump speed during both said first and second retarding steps.

13. A method for retarding a work machine having a fluid-cooled brake system, comprising the steps of:

advancing said work machine at a first ground speed during a first period of time;

sensing a fluid temperature of brake coolant circulating through said brake system during said first period of time; and advancing said work machine at a second ground speed during a second period of time based on said fluid temperature.

14. The method of claim 13, further comprising the step of determining if said fluid temperature is within a predetermined temperature range, wherein:

said second advancing step includes the step of advancing said work machine at said second ground speed if said fluid temperature is above said predetermined temperature range, and said second ground speed is less than said first ground speed.

15. The method of claim 13, further comprising the step of determining if said fluid temperature is within a predetermined temperature range, wherein:

said second advancing step includes the step of advancing said work machine at said second ground speed if said fluid temperature is below said predetermined temperature range, and said second ground speed is greater than said first ground speed.

16. The method of claim 13, wherein said work machine further has a radiator fan for cooling engine coolant advancing through a radiator, further comprising the step of:

operating said radiator fan at a substantially constant fan speed during both said first and said second time periods.

17. The method of claim 13, wherein said work machine further has a cooling pump for advancing said brake coolant through said brake system, further comprising the step of:

operating said brake cooling pump at a substantially constant pump speed during both said first and said second time periods.

18. An apparatus for retarding a work machine, comprising:

a fluid-cooled brake system which applies braking force to a wheel assembly of said work machine in order to control ground speed of said work machine;

a sensor for sensing a fluid temperature of a brake coolant circulating through said fluid-cooled brake system; and a controller which is configured to adjust braking force applied by said fluid-cooled brake assembly to said wheel assembly of said work machine based on said fluid temperature of said brake coolant whereby ground speed of said work machine is adjusted.

19. The apparatus of claim 18, further comprising:

an engine for providing motive power to said work machine;

a radiator fan for cooling engine coolant circulating through a radiator, wherein said controller causes said radiator fan to be operated at a substantially constant fan speed irrespective of engine speed of said engine.

20. The apparatus of claim 18, further comprising:

an engine for providing motive power to said work machine;

a circulation pump for circulating brake coolant through said fluid-cooled brake system, wherein said controller causes said circulation pump to be operated at a substantially constant pump speed irrespective of engine speed of said engine.

* * * * *